US010739775B2

(12) United States Patent
Sun et al.

(10) Patent No.: US 10,739,775 B2
(45) Date of Patent: Aug. 11, 2020

(54) SYSTEM AND METHOD FOR REAL WORLD AUTONOMOUS VEHICLE TRAJECTORY SIMULATION

(71) Applicant: TuSimple, Inc., San Diego, CA (US)

(72) Inventors: Xing Sun, San Diego, CA (US); Wutu Lin, San Diego, CA (US); Liu Liu, San Diego, CA (US); Kai-Chieh Ma, San Diego, CA (US); Zijie Xuan, San Diego, CA (US); Yufei Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 166 days.

(21) Appl. No.: 15/796,765

(22) Filed: Oct. 28, 2017

(65) Prior Publication Data

US 2019/0129436 A1     May 2, 2019

(51) Int. Cl.
*G05D 1/02*     (2020.01)
*G05D 1/00*     (2006.01)
(Continued)

(52) U.S. Cl.
CPC ......... *G05D 1/0221* (2013.01); *G05B 13/048* (2013.01); *G05D 1/0088* (2013.01); *G06N 20/00* (2019.01)

(58) Field of Classification Search
CPC ............... G05D 1/0221; G05D 1/0088; G05D 2201/0213; G05D 1/0238; G05D 1/0223;
(Continued)

(56) References Cited

U.S. PATENT DOCUMENTS 6,777,904 B1   8/2004  Degner
7,103,460 B1   9/2006  Breed
(Continued)

FOREIGN PATENT DOCUMENTS

EP    1754179 A1    2/2007
EP    2448251 A2    5/2012
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Hunter B Lonsberry
*Assistant Examiner* — Luis A Martinez Borrero
(74) *Attorney, Agent, or Firm* — Paul Liu; Jim Salter (57) ABSTRACT

A system and method for real world autonomous vehicle trajectory simulation are disclosed. A particular embodiment includes: receiving training data from a real world data collection system; obtaining ground truth data corresponding to the training data; performing a training phase to train a plurality of trajectory prediction models; and performing a simulation or operational phase to generate a vicinal scenario for each simulated vehicle in an iteration of a simulation, the vicinal scenarios corresponding to different locations, traffic patterns, or environmental conditions being simulated, provide vehicle intention data corresponding to a data representation of various types of simulated vehicle or driver intentions, generate a trajectory corresponding to perception data and the vehicle intention data, execute at least one of the plurality of trained trajectory prediction models to generate a distribution of predicted vehicle trajectories for each of a plurality of simulated vehicles of the simulation based on the vicinal scenario and the vehicle
(Continued)

intention data, select at least one vehicle trajectory from the distribution based on pre-defined criteria, and update a state and trajectory of each of the plurality of simulated vehicles based on the selected vehicle trajectory from the distribution.

20 Claims, 4 Drawing Sheets (51) Int. Cl.
  *G05D 13/04* (2006.01)
  *G06N 20/00* (2019.01)
  *G05B 13/04* (2006.01)

(58) Field of Classification Search
  CPC ........ G05D 1/0212; G06N 20/00; G06N 5/04; G06N 5/046; G06N 20/10; G05B 13/048
  See application file for complete search history.

(56) References Cited

U.S. PATENT DOCUMENTS

| | | |
|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,126,642 B2 * | 2/2012 | Trepagnier ........... G05D 1/0214 701/423 |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,437,890 B2 * | 5/2013 | Anderson ............. B60W 30/09 701/3 |
| 8,478,072 B2 | 7/2013 | Aisaka |
| 8,553,088 B2 | 10/2013 | Stein |
| 8,744,648 B2 * | 6/2014 | Anderson ................ G05D 1/00 701/3 |
| 8,788,134 B1 | 7/2014 | Litkouhi |
| 8,805,601 B2 * | 8/2014 | Aso ........................ G08G 1/165 701/21 |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,147,353 B1 * | 9/2015 | Slusar ................... G08G 1/0129 |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,612,123 B1 * | 4/2017 | Levinson ............... B60Q 1/525 |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 9,784,592 B2 * | 10/2017 | Gupta ................ G01C 21/3697 |
| 9,873,427 B2 * | 1/2018 | Danzl .................... B60W 10/18 |
| 9,878,710 B2 * | 1/2018 | Schmudderich ......... G06N 5/02 |
| 9,989,964 B2 * | 6/2018 | Berntorp .............. G05D 1/0088 |
| 10,019,011 B1 * | 7/2018 | Green ................. G05D 1/0223 |
| 10,102,750 B2 * | 10/2018 | Aso ........................ B60W 30/10 |
| 10,466,716 B1 * | 11/2019 | Su .......................... G06N 20/00 |
| 10,466,717 B1 * | 11/2019 | Su ............................ G06N 3/08 |
| 10,564,643 B2 * | 2/2020 | Lui ......................... G05D 1/0221 |
| 10,569,773 B2 * | 2/2020 | Zhao ................... G06K 9/00798 |
| 2007/0230792 A1 | 10/2007 | Shashua |
| 2008/0249667 A1 | 10/2008 | Horvitz |
| 2009/0024357 A1 * | 1/2009 | Aso ........................ B60W 30/10 702/181 |
| 2009/0040054 A1 | 2/2009 | Wang |
| 2010/0049397 A1 | 2/2010 | Lin |
| 2010/0106356 A1 * | 4/2010 | Trepagnier ........... G05D 1/0248 701/25 |
| 2010/0226564 A1 | 9/2010 | Marchesotti |
| 2010/0281361 A1 | 11/2010 | Marchesotti |
| 2010/0292886 A1 * | 11/2010 | Szczerba ............... G01S 13/723 701/31.4 |
| 2011/0206282 A1 | 8/2011 | Aisaka |
| 2012/0083947 A1 * | 4/2012 | Anderson ......... B60W 50/0098 701/3 |
| 2012/0105639 A1 | 5/2012 | Stein |
| 2012/0140076 A1 | 6/2012 | Rosenbaum |
| 2012/0170801 A1 | 7/2012 | De Oliveira |
| 2012/0274629 A1 | 11/2012 | Baek |
| 2012/0281904 A1 | 11/2012 | Gong |
| 2014/0114556 A1 * | 4/2014 | Pan ........................ G08G 1/00 701/119 |
| 2014/0145516 A1 | 5/2014 | Hirosawa |
| 2014/0198184 A1 | 7/2014 | Stein |
| 2015/0062304 A1 | 3/2015 | Stein |
| 2015/0321699 A1 * | 11/2015 | Rebhan .................. B60W 30/16 701/23 |
| 2015/0353082 A1 | 12/2015 | Lee |
| 2016/0037064 A1 | 2/2016 | Stein |
| 2016/0059855 A1 * | 3/2016 | Rebhan .................. B60W 30/08 701/41 |
| 2016/0094774 A1 | 3/2016 | Li |
| 2016/0129907 A1 | 5/2016 | Kim |
| 2016/0165157 A1 | 6/2016 | Stein |

(56) References Cited

U.S. PATENT DOCUMENTS

| | | | | |
|---|---|---|---|---|
| 2016/0200317 | A1* | 7/2016 | Danzl | B60W 10/18 |
| | | | | 701/25 |
| 2016/0210528 | A1 | 7/2016 | Duan | |
| 2016/0321381 | A1 | 11/2016 | English | |
| 2016/0325743 | A1* | 11/2016 | Schmudderich | B60W 50/0097 |
| 2016/0350930 | A1 | 12/2016 | Lin | |
| 2016/0375907 | A1 | 12/2016 | Erban | |
| 2017/0016734 | A1* | 1/2017 | Gupta | B60W 30/00 |
| 2017/0039890 | A1* | 2/2017 | Truong | G07C 5/08 |
| 2017/0053412 | A1 | 2/2017 | Shen | |
| 2017/0124781 | A1* | 5/2017 | Douillard | G05D 1/0268 |
| 2017/0132334 | A1* | 5/2017 | Levinson | G05D 1/0214 |
| 2017/0269561 | A1* | 9/2017 | Wood | G06F 8/41 |
| 2018/0120843 | A1* | 5/2018 | Berntorp | G06N 3/08 |
| 2018/0164804 | A1* | 6/2018 | Hou | G05D 1/0038 |
| 2018/0349547 | A1* | 12/2018 | Sun | G06F 9/46 |
| 2019/0072966 | A1* | 3/2019 | Zhang | G05D 1/0212 |
| 2019/0072973 | A1* | 3/2019 | Sun | G05D 1/0221 |
| 2019/0107840 | A1* | 4/2019 | Green | B60W 30/0956 |
| 2019/0129831 | A1* | 5/2019 | Goldberg | G06F 3/04845 |
| 2019/0163181 | A1* | 5/2019 | Liu | G05D 1/0088 |
| 2019/0163182 | A1* | 5/2019 | Li | G05D 1/0223 |
| 2019/0337525 | A1* | 11/2019 | Sippl | G06K 9/00369 |
| 2019/0367020 | A1* | 12/2019 | Yan | G06K 9/00825 |
| 2020/0047769 | A1* | 2/2020 | Oguro | B60W 50/08 |
| 2020/0082248 | A1* | 3/2020 | Villegas | G05D 1/0221 |

FOREIGN PATENT DOCUMENTS

| | | |
|---|---|---|
| EP | 2463843 A2 | 6/2012 |
| EP | 2463843 A3 | 7/2013 |
| EP | 2579211 | 10/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

(56) References Cited

OTHER PUBLICATIONS

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
PCT International Search Report, International Appl. No. PCT/US2018/037644, International Filing Date: Jun. 14, 2018, dated Nov. 22, 2018.
PCT Written Opinion, International Appl. No. PCT/US2018/037644, International Filing Date: Jun. 14, 2018, dated Nov. 22, 2018.
Kyoungho Ahn, Hesham Rakha, "The Effects of Route Choice Decisions on Vehicle Energy Consumption and Emissions", Virginia Tech Transportation Institute, date unknown.

\* cited by examiner

SYSTEM AND METHOD FOR REAL WORLD AUTONOMOUS VEHICLE TRAJECTORY SIMULATION

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for autonomous driving simulation systems, trajectory planning, vehicle control systems, and autonomous driving systems, and more particularly, but not by way of limitation, to a system and method for real world autonomous vehicle trajectory simulation.

BACKGROUND

An autonomous vehicle is often configured to follow a trajectory based on a computed driving path. However, when variables such as obstacles are present on the driving path, the autonomous vehicle must perform control operations so that the vehicle may be safely driven by changing the driving path to avoid the obstacles. In the related art, autonomous vehicle control operations have been determined by representing spatial information (e.g., a coordinate, a heading angle, a curvature, etc.) of the driving path as a polynomial expression or mathematical function for a movement distance in order to avoid a stationary obstacle. However, when dynamic obstacles are present on the driving path, the autonomous vehicle according to the related art may not accurately predict whether or not the vehicle will collide with the dynamic obstacles. In particular, the related art does not consider the interaction between the autonomous vehicle and other dynamic vehicles. Therefore, conventional autonomous vehicle control systems cannot accurately predict the future positions of other proximate dynamic vehicles. Further, conventional simulation systems do not consider the typical responses and behaviors of human drivers, which is often different than the response or behavior generated by a computing system. As a result, the optimal behavior of the conventional autonomous vehicle cannot be achieved.

SUMMARY

A system and method for real world autonomous vehicle trajectory simulation is disclosed herein. Specifically, the present disclosure describes a data-driven system and method to simulate trajectory patterns of vehicles driven by human drivers for the purpose of establishing a traffic simulation with high fidelity. To eliminate the gap between simulated trajectories and actual trajectories of vehicles driven by human drivers under a similar situation, the system and method of various example embodiments may include various sensors to collect vehicle sensor data corresponding to driving patterns of human drivers, which is considered when building models to simulate trajectories of vehicles driven by human drivers.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for real world autonomous vehicle trajectory simulation is disclosed herein. Specifically, the present disclosure describes a data-driven system and method to simulate trajectory patterns of vehicles driven by human drivers for the purpose of establishing a traffic simulation with high fidelity. To eliminate the gap between simulated trajectories and actual trajectories of vehicles driven by human drivers under a similar situation, the system and method of various example embodiments may include various sensors to collect vehicle sensor data corresponding to driving patterns of human drivers, which is considered when building models to simulate trajectories of vehicles driven by human drivers.

Figure 1:
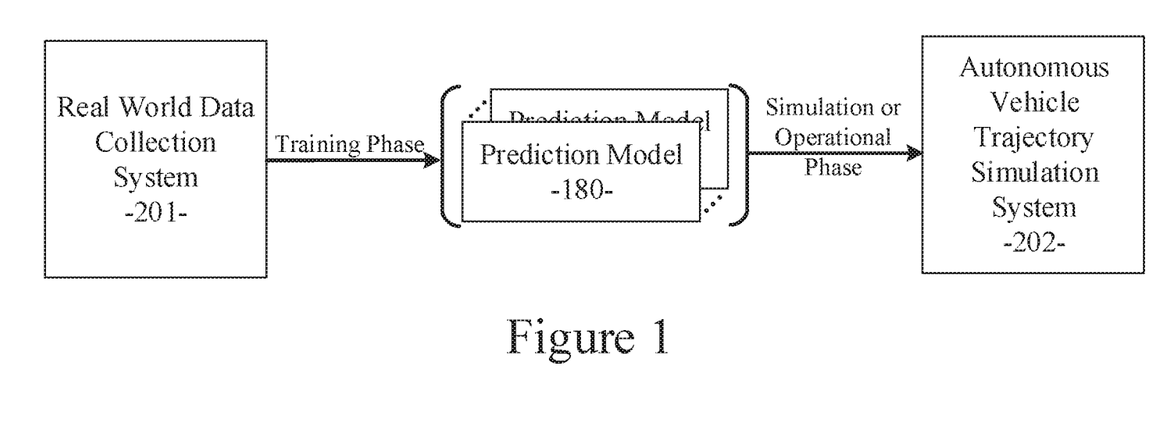
FIG. 1 illustrates a first phase for building an autonomous vehicle trajectory simulation system in an example embodiment.

As described in various example embodiments, a system and method for real world autonomous vehicle trajectory simulation are described herein. Referring to FIG. 1, an example embodiment disclosed herein can be used in the context of a trajectory simulation system 202 for autonomous vehicles. In particular, the real world data collection system 201 can be used to generate or train one or more trajectory prediction models 180. As described in more detail below for an example embodiment, the autonomous vehicle trajectory simulation system 202 can use one or more of the trained trajectory prediction models 180 to generate simulated vehicle trajectories based on driving intentions and vicinal scenarios provided to the autonomous vehicle trajectory simulation system 202 and based on the training the trajectory prediction models 180 receive from the data collection system 201.

The data collection system 201 can include an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the data collection system 201 positioned adjacent to particular roadways (e.g., monitored locations). Additionally, the data collection system 201 can include information gathering devices installed in moving test vehicles being navigated through pre-defined routings in an environment or location of interest. The perception information can include data from which a position and velocity of neighboring vehicles in the vicinity of or proximate to the autonomous vehicle can be obtained or calculated. Corresponding ground truth data can also be gathered by the data collection system 201.

The real world data collection system 201 can collect actual trajectories of vehicles and corresponding ground truth data under different scenarios and different driver intentions. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver intentions can correspond to a driver's short term driving goals, such as merging to a ramp, making right turn at an intersection, making a U-turn, and the like. The driver intentions can also correspond to a set of driver or vehicle control actions to accomplish a particular short term driving goal.

The image data and other perception data and ground truth data collected by the data collection system 201 reflects truly realistic, real-world traffic information related to the locations or routings, the scenarios, and the driver intentions being monitored. Using the standard capabilities of well-known data collection devices, the gathered traffic and vehicle image data and other perception or sensor data can be wirelessly transferred (or otherwise transferred) to a data processor of a standard computing system, upon which the real world data collection system 201 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, the ground truth data and the driver intention data gathered or calculated by the real world data collection system 201 can be used to generate training data, which can be processed by the one or more trajectory prediction models 180 in a training phase. For example, as well-known, neural networks, or other machine learning systems, can be trained to produce configured output based on training data provided to the neural network or other machine learning system in a training phase. The training data provided by the real world data collection system 201 can be used to build and/or train the generative prediction model (trajectory prediction models 180 shown in FIGS. 1 and 2) that can predict vehicles' future trajectories given their driving intentions and vicinal scenarios as described in more detail below. Once the one or more trajectory prediction models 180 are trained with the real world data collection system 201 in the training phase, the trained one or more trajectory prediction models 180 can be integrated into or connected with the autonomous vehicle trajectory simulation system 202. As described in more detail below, the autonomous vehicle trajectory simulation system 202 can use the trained one or more trajectory prediction models 180 in a simulation or operational phase to produce predicted vehicle trajectories given their driving intentions and vicinal scenarios.

Figure 2:
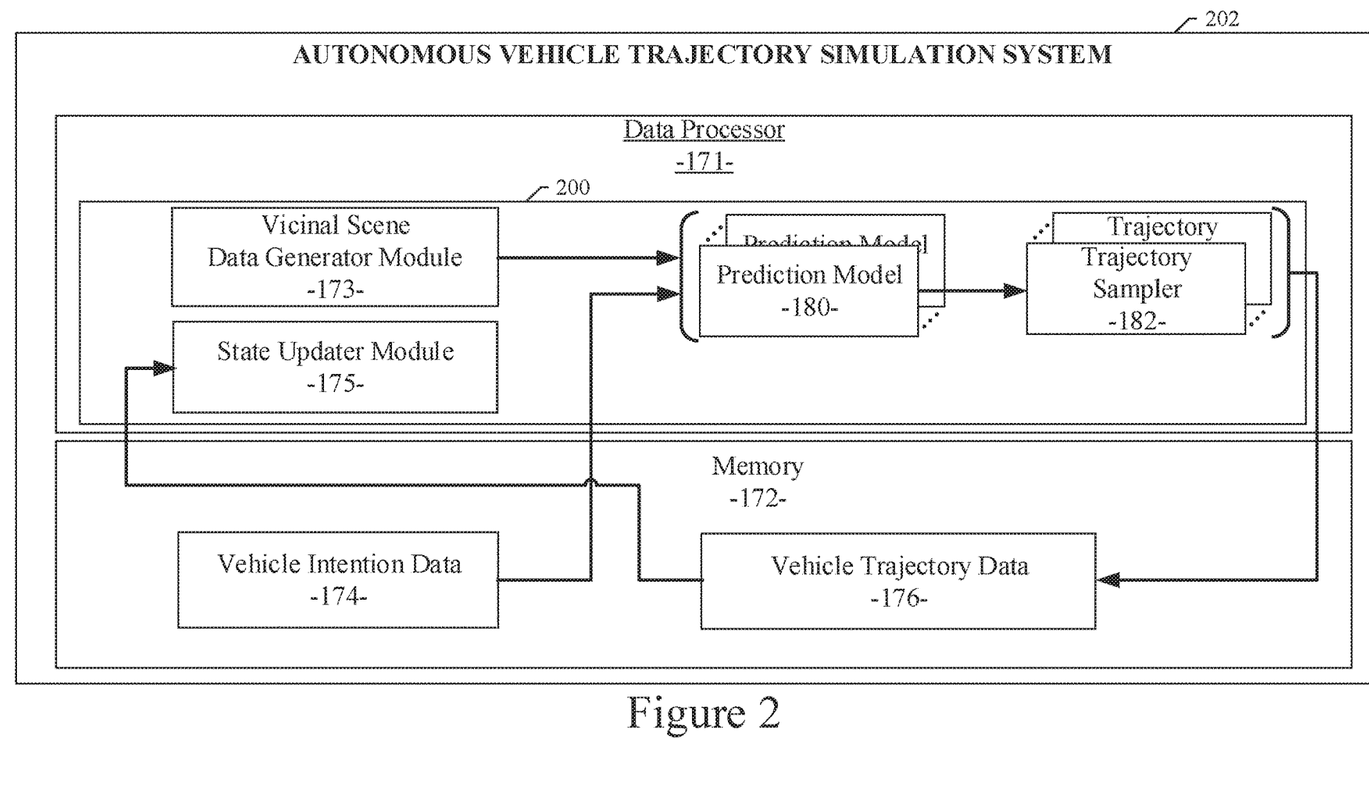
FIG. 2 illustrates the components of the autonomous vehicle trajectory simulation system of an example embodiment in a second phase.

Referring to FIG. 2, components of the autonomous vehicle trajectory simulation system 202 are illustrated. The autonomous vehicle trajectory simulation system 202 can use the machine learning training provided by the real world data collection system 201 in the training phase and the real-world vehicle/object scenarios or vicinal scenes generated by the vicinal scene data generator module 173 in a simulation phase to create corresponding simulations of vehicle or object trajectories in a prediction model. As a result, the example embodiments use the real world data collection system 201 in the training phase to collect data corresponding to human driving behaviors and train the one or more trajectory prediction models 180. Additionally, example embodiments can use a loss function in the training phase to examine and correct the results of the training provided to the one or more trajectory prediction models 180 by the real world data collection system 201. Then, the example embodiments can use the autonomous vehicle trajectory simulation system 202 in the simulation or operational phase to simulate human driving behaviors using the trained one or more trajectory prediction models 180.

In an example embodiment, the processing performed by the example embodiments can be divided into two stages: the offline training phase, and the operational or simulation phase. In the offline training phase, the processed data provided by the real world data collection system 201 can be used to generate and/or train the plurality of trajectory prediction models 180 (shown in FIGS. 1 and 2), the use of which is described in more detail below. In an example embodiment, the prediction models 180 can be implemented as neural networks or other machine learning systems, which can be trained using the processed data provided by the real world data collection system 201. As a result, the prediction models 180 can be trained to simulate or predict the behavior and trajectories of simulated vehicles with simulated drivers in a simulation scenario based on the processed data provided by the real world data collection system 201. Because the prediction models 180 are trained using real world data, the predicted behavior and trajectories of simulated vehicles produced by the prediction models 180 are closely correlated to the actual behavior and trajectories of vehicles in a real world environment.

After the prediction models 180 are trained in the training phase as described above, the prediction models 180 can be deployed in an operational or simulation phase of the autonomous vehicle trajectory simulation system 202. In the operational or simulation phase, the autonomous vehicle trajectory simulation system 202 can generate vicinal scenarios for each of a plurality of simulated vehicles in a simulation system. The vicinal scenarios serve to predict the behaviors and trajectories of vehicles in simulation based on scenarios driven by a vicinal scene data generator 173 and vehicle intention data 174 described in more detail below.

As a result of the processing performed by the autonomous vehicle trajectory simulation system 202, data corresponding to predicted or simulated driver behaviors and predicted or simulated vehicle trajectories can be produced and fed back into the simulation system 202 to improve the accuracy of the predicted trajectories. Ultimately, the improved simulation system 202 can be used to provide highly accurate predicted traffic trajectory information to a user or for configuration of a control system of an autonomous vehicle. In particular, the predicted or simulated traffic trajectory information can be provided to a system component used to create a virtual world where a control system for an autonomous vehicle can be trained and improved. The virtual world is configured to be identical (as possible) to the real world where vehicles are operated by human drivers. In other words, the predicted or simulated traffic trajectory information generated by the autonomous vehicle trajectory simulation system 202 is indirectly useful for configuring the control systems for an autonomous vehicle. It will be apparent to those of ordinary skill in the art that the autonomous vehicle trajectory simulation system 202 and the predicted or simulated traffic trajectory information described and claimed herein can be implemented, configured, processed, and used in a variety of other applications and systems as well.

Referring again to FIG. 2, a diagram illustrates the components of the autonomous vehicle trajectory simulation system 202 of an example embodiment. In the example embodiment, the autonomous vehicle trajectory simulation system 202 can be configured to include an autonomous vehicle trajectory simulation module 200 configured for execution by a data processor 171 in a computing environment of the autonomous vehicle trajectory simulation system 202. In the example embodiment, the autonomous vehicle trajectory simulation module 200 can be configured to include a vicinal scene data generator module 173, a state updater module 175, a plurality of prediction models 180, and a plurality of trajectory samplers 182. The vicinal scene data generator module 173, state updater module 175, the plurality of prediction models 180, and the plurality of trajectory samplers 182 can be configured as software modules for execution by the data processor 171. As described in more detail below, the vicinal scene data generator module 173 serves to generate a vicinal scenario for each simulated vehicle in the simulation system. The different vicinal scenarios can correspond to different locations, different traffic patterns, different environmental conditions, and the like. The vicinal scenarios can be represented, for example, by an occupancy grid, a collection of vehicle states on a map, or a graphical representation, such as a top-down image of one or more areas of interest. The vicinal scenarios can also correspond to a particular set of conditions in which the simulated vehicle is operating. For example, the vicinal scenario can include the simulated location of the simulated vehicle, the simulated road and traffic conditions, the environmental conditions, the vehicle and occupant status, and the like. The vicinal scenario can be used to vary the simulated conditions across a wide variety of different kinds of circumstances typical in the real world. The vicinal scenario data generated by the vicinal scene data generator module 173 for a particular iteration of the simulation can be passed to one of the plurality of prediction models 180 as shown in FIG. 2 and described in more detail below.

A data storage device or memory 172 is also provided in the autonomous vehicle trajectory simulation system 202 of an example embodiment. The memory 172 can be implemented with standard data storage devices (e.g., flash memory, DRAM, SIM cards, or the like) or as cloud storage in a networked server. In an example embodiment, the memory 172 can be used to store a set of vehicle intention data 174. The vehicle intention data 174 corresponds to a data representation of various types of simulated vehicle and/or driver intentions. The simulated vehicle and/or driver intentions can correspond to a driver's short term driving goals, such as merging to a ramp, making right turn at an intersection, making a U-turn, and the like. The simulated vehicle and/or driver intentions can also correspond to a set of driver or vehicle control actions to accomplish a particular short term driving goal. The simulated vehicle and/or driver intentions for a variety of different vehicle actions and behaviors can be stored in the memory 172 as vehicle intention data 174. In a particular embodiment, the vicinal scene data generator module 173 can select a particular set of the vehicle intention data 174 to be processed with a particular vicinal scenario dataset configured by the vicinal scene data generator module 173 for an iteration of the simulation. In another embodiment, the particular set of the vehicle intention data 174 can be pre-determined prior to the execution of the simulation. For each iteration of the simulation, the vehicle intention data 174 can be passed to one of the plurality of prediction models 180 as shown in FIG. 2 and described in more detail below.

In the example embodiment shown in FIG. 2, the autonomous vehicle trajectory simulation system 202 can be configured to include or connect with a plurality of trained prediction models 180 used to simulate or predict the behavior and trajectories of simulated vehicles with simulated drivers in a simulation scenario. In particular, the plurality of trained prediction models 180 enable the generation of a distribution of predicted vehicle trajectories for each of a plurality of simulated vehicles of the simulation based on a particular vicinal scenario dataset configured by the vicinal scene data generator module 173 and a corresponding vehicle intention dataset 174. For each of the vehicle trajectories in each of the generated trajectory distributions, a confidence value, likelihood rating, or probability value can also be computed by the prediction models 180 to specify a degree of likelihood or probability that the particular simulated vehicle will actually traverse the corresponding trajectory of the distribution. The trained prediction models 180 represent a simulated virtual world configured to be identical (as possible) to the real world where vehicles are operated by human drivers. The virtual world can be used to train and improve a control system for an autonomous vehicle. Thus, the simulation produced by the autonomous vehicle trajectory simulation system 202 can be indirectly useful for configuring the control systems in autonomous vehicles. The plurality of trained prediction models 180 can be parameterized models, which may be configured or trained using either (or both) real-world input provided by the data collection system 201 or randomized variables. In one example, the trained prediction models 180 may simulate the typical and atypical driver behaviors, such as steering or heading control, speed or throttle control, and stopping or brake control. In one example, the trained prediction models 180 may use, for example, sensory-motor transport delay, dynamic capabilities, and preferred driving behaviors. In some implementations, the trained prediction models 180 may include modeling of the transport time delay between a stimulus and the simulated driver's control response. In some implementations, this delay may represent the time necessary for the driver to sense a stimulus, process it, determine the best corrective action, and respond. The trained prediction models 180 may also include a speed control model with an absolute maximum vehicle speed (e.g., the maximum speed of the vehicle, the speed a driver is not comfortable exceeding, etc.) and a cornering aggressiveness measure to reduce the speed based on the turning radius. In the example, this may replicate the tendency of drivers to slow down through a turn. In the example, once the turning radius drops below the cornering threshold in the scenario, the speed may be reduced in proportion to the tightness of the turn.

In various example embodiments, the plurality of prediction models 180 can be configured or trained to simulate more than the typical driving behaviors. To simulate an environment that is identical to the real world as much as possible, the prediction models 180 can receive training related to typical driving behaviors, which represent average people. Additionally, the prediction models 180 can receive training related to atypical driving behaviors. In most cases, training data related to typical and atypical driver and vehicle behaviors is used by the data collection system 201 to train the prediction models 180. In other words, in reality, most human drivers drive vehicles in a pleasant and humble way, while other drivers drive aggressively and impatiently. Because the plurality of prediction models 180 of an example embodiment is trained using real world driving and traffic data from the data collection system 201, the plurality of prediction models 180 of the various example embodiments receives training related to the driving behaviors of polite and impolite drivers as well as patient and impatient drivers in the virtual world. In all, the trained prediction models 180 can be configured with data representing driving behaviors that are as varied as possible. In some implementations, the dynamics of how a human may respond to stimuli may be included in the logic implemented in the trained prediction models 180, which may include, for example, a metric of how aggressively the driver brakes, turns, and accelerates. In some implementations, an aggressive driver may be modeled as one who applies very high control inputs to achieve the desired vehicle speeds, while a conservative driver may use more gradual control inputs. In some implementations, this may be modeled using parameterized values, with the input being controlled to the desired value. In some implementations, by adjusting the parameterized values, the aggressiveness of the simulated driver may be increased or decreased.

As described above, the plurality of trained prediction models 180, for each iteration of the simulation in the simulation or operational phase, enable the generation of a distribution of vehicle trajectories with corresponding likelihood ratings or probability values for each of a plurality of simulated vehicles of the simulation based on a particular vicinal scenario dataset configured by the vicinal scene data generator module 173 and a corresponding vehicle intention dataset 174. For each iteration of the simulation and for each of the plurality of trained prediction models 180, one of the plurality of trajectory samplers 182 can select a particular trajectory from the distribution of vehicle trajectories generated for the particular iteration. The particular trajectory can be selected based on a variety of pre-defined criteria including a maximal or minimal likelihood rating or probability value, conformity with pre-defined safety parameters, conformity with pre-defined economy parameters, conformity with pre-defined timing or distance parameters, and the like. The particular trajectory selected by the one of the plurality of trajectory samplers 182 can be stored in the memory 172 as vehicle trajectory data 176. Once the particular trajectory is selected and the vehicle trajectory data 176 for the current iteration is stored, the state updater module 175 can update the states and predicted trajectories of all simulated vehicles in the simulation according to the selected trajectory. The predicted vehicle trajectories retained as vehicle trajectory data 176 can be saved and fed back into the state updated module 175 to improve the accuracy of the predicted trajectories. At this point, the current iteration of the simulation is complete and control is passed back to the vicinal scene data generator module 173 for the start of the next iteration of the simulation in the simulation or operational phase. As described above, the vicinal scene data generator module 173 generates a new vicinal scenario for each simulated vehicle in the simulation system for the next iteration. The new vicinal scenarios are passed to the plurality of trained prediction models 180. A new set of vehicle intention data 174 is also selected or generated and passed to the plurality of trained prediction models 180. The trained prediction models 180 use the new vicinal scenarios and the new set of vehicle intention data 174 to produce a new distribution of vehicle trajectories for each of a plurality of simulated vehicles with corresponding likelihood ratings or probability values for the next iteration as described above. As a result, the autonomous vehicle trajectory simulation system 202 of an example embodiment can produce an interactive, realistic traffic simulation.

Figure 3:
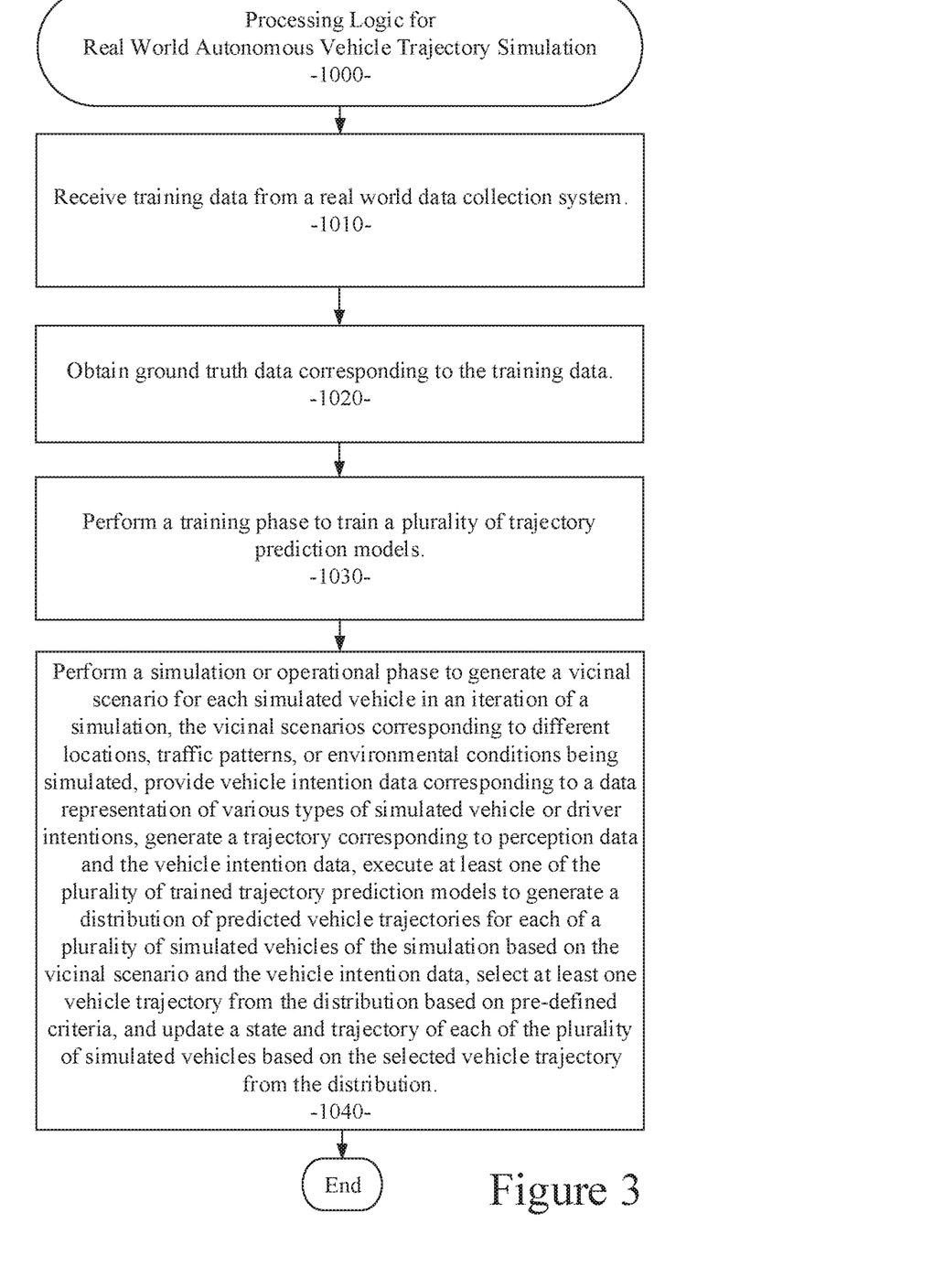
FIG. 3 is a process flow diagram illustrating an example embodiment of a system and method for real world autonomous vehicle trajectory simulation.

Referring now to FIG. 3, a flow diagram illustrates an example embodiment of a system and method 1000 for providing trajectory simulation of autonomous vehicles. The example embodiment can be configured for: receiving training data from a real world data collection system (processing block 1010); obtaining ground truth data corresponding to the training data (processing block 1020); performing a training phase to train a plurality of trajectory prediction models (processing block 1030); and performing a simulation or operational phase to generate a vicinal scenario for each simulated vehicle in an iteration of a simulation, the vicinal scenarios corresponding to different locations, traffic patterns, or environmental conditions being simulated, provide vehicle intention data corresponding to a data representation of various types of simulated vehicle or driver intentions, generate a trajectory corresponding to perception data and the vehicle intention data, execute at least one of the plurality of trained trajectory prediction models to generate a distribution of predicted vehicle trajectories for each of a plurality of simulated vehicles of the simulation based on the vicinal scenario and the vehicle intention data, select at least one vehicle trajectory from the distribution based on pre-defined criteria, and update a state and trajectory of each of the plurality of simulated vehicles based on the selected vehicle trajectory from the distribution (processing block 1040).

Figure 4:
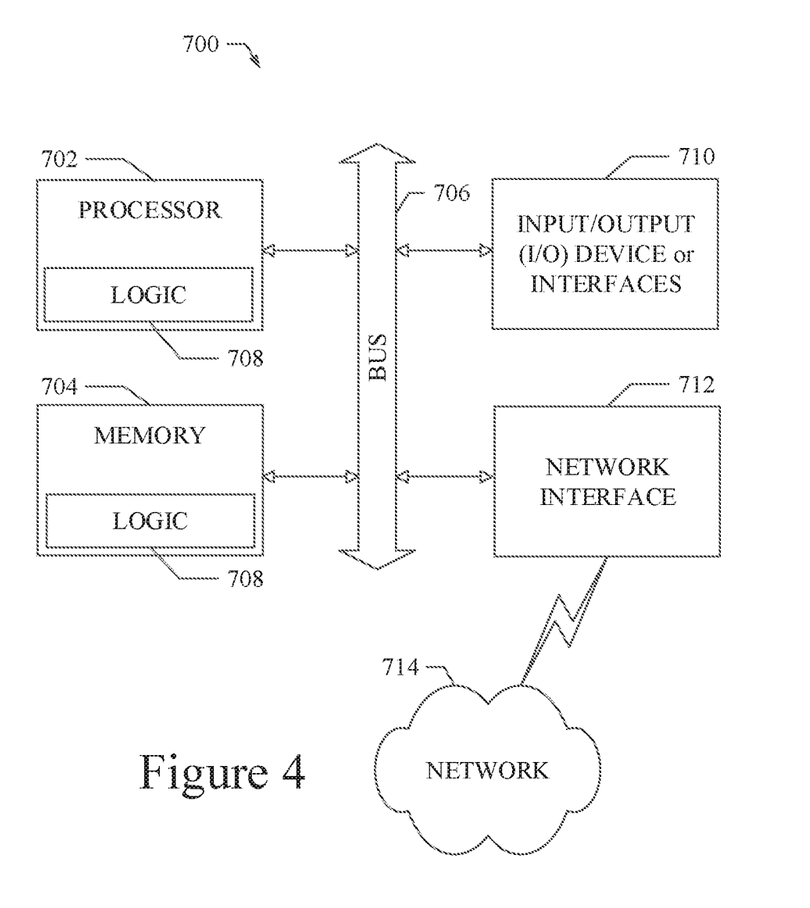
FIG. 4 shows a diagrammatic representation of machine in the example form of a computer system within which a set of instructions when executed may cause the machine to perform any one or more of the methodologies discussed herein.

FIG. 4 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor in a computing system;
   a data collection system, executable by the data processor of the computing system, to collect training data comprising perception or sensor data and ground truth data, and perform a training phase to train a plurality of trajectory prediction models with the training data to produce a plurality of trained trajectory prediction models, the data collection system comprising sensor devices, the sensor devices comprising at least one image generating device, the sensor devices, installed at various traffic locations or installed on moving test vehicles, collecting perception or sensor data from the various traffic locations or from the moving test vehicles, the plurality of trained trajectory prediction models comprising at least one trained trajectory prediction model configured to model a variable level of simulated driver aggressiveness, the collected training data being transferred to the data collection system;
   a vicinal scene data generator to generate, by the data processor, a different vicinal scenario for each simulated vehicle in an iteration of a simulation;
   a memory for storage of vehicle intention data representing simulated vehicle or driver intentions for a plurality of different vehicle actions and behaviors; and
   a trajectory simulation module, executable by the data processor of the computing system, the trajectory simulation module being configured to perform a simulation or operational phase to:
   generate, by the data processor, a trajectory corresponding to the collected perception data and the vehicle intention data, execute, by the data processor, at least one of the plurality of trained trajectory prediction models to generate a predicted simulated vehicle trajectory for each of a plurality of simulated vehicles of the simulation based on a corresponding generated vicinal scenario and the vehicle intention data, the predicted simulated vehicle trajectory comprising data indicative of a degree of likelihood or probability that a particular simulated vehicle will traverse the corresponding predicted simulated vehicle trajectory, use the predicted simulated vehicle trajectory, and update, by the data processor, a state and trajectory of each of the plurality of simulated vehicles based on the predicted simulated vehicle trajectory, the plurality of trained trajectory prediction models being used for configuring a control system in an autonomous vehicle.

2. The system of claim 1 wherein the trajectory simulation operation comprises machine learnable components.

3. The system of claim 1 wherein the trajectory simulation operation is performed over multiple iterations.

4. The system of claim 1 wherein the trajectory simulation operation being further configured to receive an array of sensor information gathered at the various traffic locations by the data collection system.

5. The system of claim 1 wherein the different vicinal scenarios correspond to different locations, traffic patterns, or environmental conditions being simulated.

6. The system of claim 1 wherein the trajectory simulation module being further configured to execute, by the data processor, at least one of the plurality of trained trajectory prediction models to generate a distribution of predicted simulated vehicle trajectories for each of a plurality of simulated vehicles of the simulation based on a corresponding generated vicinal scenario and the vehicle intention data, the distribution of predicted simulated vehicle trajectories comprising data indicative of a degree of likelihood or probability that a particular simulated vehicle will traverse a corresponding trajectory of the distribution of predicted simulated vehicle trajectories, select at least one simulated vehicle trajectory from the distribution of predicted simulated vehicle trajectories based on pre-defined criteria, and update, by the data processor, a state and trajectory of each of the plurality of simulated vehicles based on the selected simulated vehicle trajectory from the distribution of predicted simulated vehicle trajectories.

7. The system of claim 1 wherein the variable level of simulated driver aggressiveness is modeled from behaviors of human drivers collected by the data collection system.

8. A method comprising:
receiving training data, by a data processor in a computing system, from a data collection system, the data collection system comprising sensor devices, the sensor devices comprising at least one image generating device, the sensor devices, installed at various traffic locations or installed on moving test vehicles, collecting perception or sensor data from the various traffic locations or from the moving test vehicles;
obtaining ground truth data corresponding to the training data;
transferring the collected training data to the data collection system;
using the data collection system, executed by the data processor of the computing system, and the training data to train a plurality of trajectory prediction models to produce a plurality of trained trajectory prediction models, the plurality of trained trajectory prediction models comprising at least one trained trajectory prediction model configured to model a variable level of simulated driver aggressiveness; and
performing, by the data processor, a simulation or operational phase to generate a different vicinal scenario for each simulated vehicle in an iteration of a simulation, provide vehicle intention data corresponding to a data representation of various types of simulated vehicle or driver intentions for a plurality of different vehicle actions and behaviors, generate, by the data processor, a trajectory corresponding to the collected perception data and the vehicle intention data, execute, by the data processor, at least one of the plurality of trained trajectory prediction models to generate a predicted simulated vehicle trajectory for each of a plurality of simulated vehicles of the simulation based on a corresponding generated vicinal scenario and the vehicle intention data, the predicted simulated vehicle trajectory comprising data indicative of a degree of likelihood or probability that a particular simulated vehicle will traverse the corresponding predicted simulated vehicle trajectory, use the predicted simulated vehicle trajectory, and update, by the data processor, a state and trajectory of each of the plurality of simulated vehicles based on the predicted simulated vehicle trajectory, the plurality of trained trajectory prediction models being used for configuring a control system in an autonomous vehicle.

9. The method of claim 8 wherein the method is machine learnable.

10. The method of claim 8 wherein the method is performed over multiple iterations.

11. The method of claim 8 comprising receiving an array of sensor information gathered at the various traffic locations by the data collection system.

12. The method of claim 8 wherein the different vicinal scenarios correspond to different locations, traffic patterns, or environmental conditions being simulated.

13. The method of claim 8 wherein the simulation or operational phase further to execute, by the data processor, at least one of the plurality of trained trajectory prediction models to generate a distribution of predicted simulated vehicle trajectories for each of a plurality of simulated vehicles of the simulation based on a corresponding generated vicinal scenario and the vehicle intention data, the distribution of predicted simulated vehicle trajectories comprising data indicative of a degree of likelihood or probability that a particular simulated vehicle will traverse a corresponding trajectory of the distribution of predicted simulated vehicle trajectories, select at least one simulated vehicle trajectory from the distribution of predicted simulated vehicle trajectories based on pre-defined criteria, and update, by the data processor, a state and trajectory of each of the plurality of simulated vehicles based on the selected simulated vehicle trajectory from the distribution of predicted simulated vehicle trajectories.

14. The method of claim 8 wherein the variable level of simulated driver aggressiveness is modeled from behaviors of human drivers collected by the data collection system.

15. A non-transitory machine-useable storage medium embodying instructions which, when executed by a machine, cause the machine to:
receive training data, by a data processor in a computing system, from a data collection system, the data collection system comprising sensor devices, the sensor devices comprising at least one image generating device, the sensor devices, installed at various traffic locations or installed on moving test vehicles, collecting perception or sensor data from the various traffic locations or from the moving test vehicles;
obtain ground truth data corresponding to the training data;
transfer the collected training data to the data collection system;
use the data collection system, executed by the data processor of the computing system, and the training data to train a plurality of trajectory prediction models to produce a plurality of trained trajectory prediction models, the plurality of trained trajectory prediction models comprising at least one trained trajectory prediction model configured to model a variable level of simulated driver aggressiveness; and
perform, by the data processor, a simulation or operational phase to generate a different vicinal scenario for each simulated vehicle in an iteration of a simulation, provide vehicle intention data corresponding to a data representation of various types of simulated vehicle or driver intentions for a plurality of different vehicle actions and behaviors, generate, by the data processor, a trajectory corresponding to the collected perception data and the vehicle intention data, execute, by the data processor, at least one of the plurality of trained trajectory prediction models to generate a predicted simulated vehicle trajectory for each of a plurality of simulated vehicles of the simulation based on a corresponding generated vicinal scenario and the vehicle intention data, the predicted simulated vehicle trajectory comprising data indicative of a degree of likelihood or probability that a particular simulated vehicle will traverse the corresponding predicted simulated vehicle trajectory, use the predicted simulated vehicle trajectory, and update, by the data processor, a state and trajectory of each of the plurality of simulated vehicles based on the predicted simulated vehicle trajectory, the plurality of trained trajectory prediction models being used for configuring a control system in an autonomous vehicle.

16. The non-transitory machine-useable storage medium of claim 15 wherein the instructions comprise machine learnable components.

17. The non-transitory machine-useable storage medium of claim 15 wherein the instructions are executed over multiple iterations.

18. The non-transitory machine-useable storage medium of claim 15 wherein the instructions being further configured to receive an array of sensor information gathered at the various traffic locations by the data collection system.

19. The non-transitory machine-useable storage medium of claim 15 wherein the different vicinal scenarios correspond to different locations, traffic patterns, or environmental conditions being simulated.

20. The non-transitory machine-useable storage medium of claim 15 being further configured to execute, by the data processor, at least one of the plurality of trained trajectory prediction models to generate a distribution of predicted simulated vehicle trajectories for each of a plurality of simulated vehicles of the simulation based on a corresponding generated vicinal scenario and the vehicle intention data, the distribution of predicted simulated vehicle trajectories comprising data indicative of a degree of likelihood or probability that a particular simulated vehicle will traverse a corresponding trajectory of the distribution of predicted simulated vehicle trajectories, select at least one simulated vehicle trajectory from the distribution of predicted simulated vehicle trajectories based on pre-defined criteria, and update, by the data processor, a state and trajectory of each of the plurality of simulated vehicles based on the selected simulated vehicle trajectory from the distribution of predicted simulated vehicle trajectories.

* * * * *